United States Patent
Fox et al.

(10) Patent No.: US 11,483,314 B2
(45) Date of Patent: Oct. 25, 2022

(54) DISTRIBUTED EVALUATION LIST UPDATING

(71) Applicant: MASTERCARD TECHNOLOGIES CANADA ULC, Vancouver (CA)

(72) Inventors: Justine Celeste Fox, Pitt Meadows (CA); Marc Grimson, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 112 days.

(21) Appl. No.: 16/984,426

(22) Filed: Aug. 4, 2020

(65) Prior Publication Data

US 2022/0046022 A1 Feb. 10, 2022

(51) Int. Cl.
*G06F 15/16* (2006.01)
*H04L 9/40* (2022.01)
*H04L 67/01* (2022.01)

(52) U.S. Cl.
CPC ........ *H04L 63/101* (2013.01); *H04L 63/0236* (2013.01); *H04L 63/20* (2013.01); *H04L 67/01* (2022.05)

(58) Field of Classification Search
CPC ... H04L 63/101; H04L 63/0236; H04L 63/20; H04L 67/42
See application file for complete search history.

(56) References Cited

U.S. PATENT DOCUMENTS

| | | | |
|---|---|---|---|
| 8,832,832 B1* | 9/2014 | Visbal | H04L 63/1425 726/25 |
| 2007/0070921 A1 | 3/2007 | Quinlan et al. | |
| 2009/0029693 A1 | 1/2009 | Liwell et al. | |
| 2015/0227732 A1* | 8/2015 | Doctor | G06F 21/31 726/4 |
| 2015/0249653 A1* | 9/2015 | Gresset | H04W 12/062 726/7 |
| 2017/0195447 A1* | 7/2017 | Panagos | H04L 67/2842 |
| 2018/0359244 A1 | 12/2018 | Cockerill et al. | |
| 2019/0028514 A1* | 1/2019 | Barboi | H04L 63/108 |
| 2019/0297083 A1* | 9/2019 | Li | H04L 63/08 |

OTHER PUBLICATIONS

International Search Report and Written Opinion for Application No. PCT/CA2021/051073 dated Oct. 18, 2021 (10 pages).

* cited by examiner

*Primary Examiner* — Phuoc H Nguyen
(74) *Attorney, Agent, or Firm* — Michael Best & Friedrich LLP

(57) ABSTRACT

Methods and systems for providing distributed evaluation list updating. One system includes a data processing server. The data processing server receiving a request event associated with an update to an active evaluation list version. The active evaluation list version is actively accessible for request validation. The data processing server also generates an updated evaluation list version according to the update associated with the request event. After generating the updated evaluation list version, the data processing server replaces the active evaluation list version with the updated evaluation list version in storage, where, in response to storing the updated evaluation list version, the updated evaluation list version is actively accessible for request validation.

20 Claims, 4 Drawing Sheets

DISTRIBUTED EVALUATION LIST UPDATING

FIELD

Embodiments described herein relate to distributed evaluation list updating.

BACKGROUND

Evaluation lists are generally used to modify application behavior based on list contents and an application's coded understanding of the list. In other words, how an application handles a request (for example, an authorization request, an authentication request, and the like) may depend on whether the attributes associated with that request are trusted or untrusted (as specified in an evaluation list). For example, when the application receives an authorization request having a specific attribute (such as a request to access sensitive information or an online banking account, where the request is associated with an Internet Protocol ("IP") address), the application may validate the request when the specific attribute is specified as trusted in a list (for example, the IP address associated with the request is included in an "allow" list). Alternatively, the application may not validate the request when the specific attribute is not included (or does not exist) in a list (for example, the IP address associated with the request is not included in an "allow" list). As yet another alternative, the application may not validate the request when the specific attribute is specified as untrusted in a list (for example, the IP address associated with the request is included in a "block" list). Lists generally have no fixed schema and can be based on scalable NoSQL storage mechanisms. Derived lists may be used to store information, such as an allow list of trusted attributes or a block list of untrusted attributes, with support for SQL search mechanisms and partial matches.

Many applications use evaluation lists for specifying trusted and untrusted request attributes or custom attributes for a particular data key. These applications typically implement lists using a traditional database system, which is based on SQL technology (use a relational approach with a fixed data schema). A technical challenge with lists implemented in this way is that a database may only support a single writeable master note, process, or instance. Accordingly, these approaches struggle to scale to millions of requests per second without specialized caching strategies that are one-off. Additionally, conventional update mechanisms struggle to update lists that are actively used by an application.

SUMMARY

Embodiments described herein provide for distributed evaluation list updating by implementing a distributed notification architecture having a decoupled design with support for high velocity queries for evaluation list lookups. For example, embodiments described herein provide for decoupled application logic such that writes are aggregated in an event stream and batch processed against one or more master databases, which enables an application to scale to higher traffic volumes. The decoupled design is optimized for scaling to approximately 10,000,000 requests per second. Embodiments described herein provide for updates that are handled out-of-band, enabling incremental, partial, or full replacement of list entries. Additionally, embodiments described herein enable minimized development time and resources for development of new types of lists.

For example, in some embodiments, a gateway forwards requests to an application handler or directly to an event stream. A list-aware module evaluates the request metadata for request validation. List information is stored in a data warehouse with support for both database lookups and event stream lookups, where the type of lookup may depend on latency requirements and a question being asked of the data set. A list-aware module responds to written request metadata on the system of record and creates supported derived data.

As an example, a gateway server may receive a request to access an online banking account (for example, an authentication request). The received request may include metadata or attributes, such as an IP address. The gateway server may route the request to an application execution server for request validation. Upon receipt of the request, the application execution server may validate the request by accessing an active evaluation list version to verify/validate an attribute of the request, such as the IP address, against the content of the active evaluation list version. For example, the application execution server may determine the request to be valid (i.e., grant access to the online banking account) when the IP address of the request is specified as a trusted attribute in the active evaluation list version.

Alternatively or in addition, the gateway server may receive a request associated with a list update (for example, an update to the active evaluation list version). The gateway server may route the request to an event stream server for further processing by a data processing server. The event stream server may provide event aggregation functionality for bulk or batch request processing. In response to a triggering notification, the data processing server accesses a request event (associated with the received request) from an event database. After accessing the request event, the data processing server generates an updated evaluation list version according to the update associated with the request event. The data processing server then replaces the active evaluation list with the updated evaluation list version in storage, where the updated evaluation list version becomes the latest active evaluation list version.

One embodiment provides a distributed evaluation list update system. The system includes a data processing server. The data processing server is configured to receive a request event associated with an update to an active evaluation list version, the active evaluation list version actively accessible for request validation. The data processing server is also configured to generate an updated evaluation list version according to the update associated with the request event. The data processing server is also configured to replace the active evaluation list version with the updated evaluation list version in storage, wherein, in response to storing the updated evaluation list version, the updated evaluation list version is actively accessible for request validation.

Another embodiment provides a method for providing distributed evaluation list updating. The method includes receiving, with a data processing server, a request event associated with an update to an active evaluation list version, the active evaluation list version actively accessible by an application server for request validation. The method also includes generating, with the data processing server, an updated evaluation list version according to the update associated with the request event. The method also includes replacing, with the data processing server, the active evaluation list version with the updated evaluation list version in storage. The method also includes, in response to receiving a request, determining, with the application server, a validation status for the request using the updated evaluation list version, and generating and transmitting, with the application server, a response to the request, the response including the validation status.

Yet another embodiment provides a non-transitory, computer-readable medium storing instructions that, when executed by an electronic processor, perform a set of functions. The set of functions includes, in response to a request event associated with the request being stored in a data storage layer, receiving, with a data processing layer, the request event from the data storage layer, the request event associated with an update to an active evaluation list version actively accessible by an application layer for request validation. The set of functions also includes generating, with the data processing layer, an updated evaluation list version according to the update. The set of functions also includes enabling, with the data processing layer, access to the updated evaluation list version by an application layer for request validation.

Other aspects of the embodiments described herein will become apparent by consideration of the detailed description and accompanying drawings.

Figure 1:
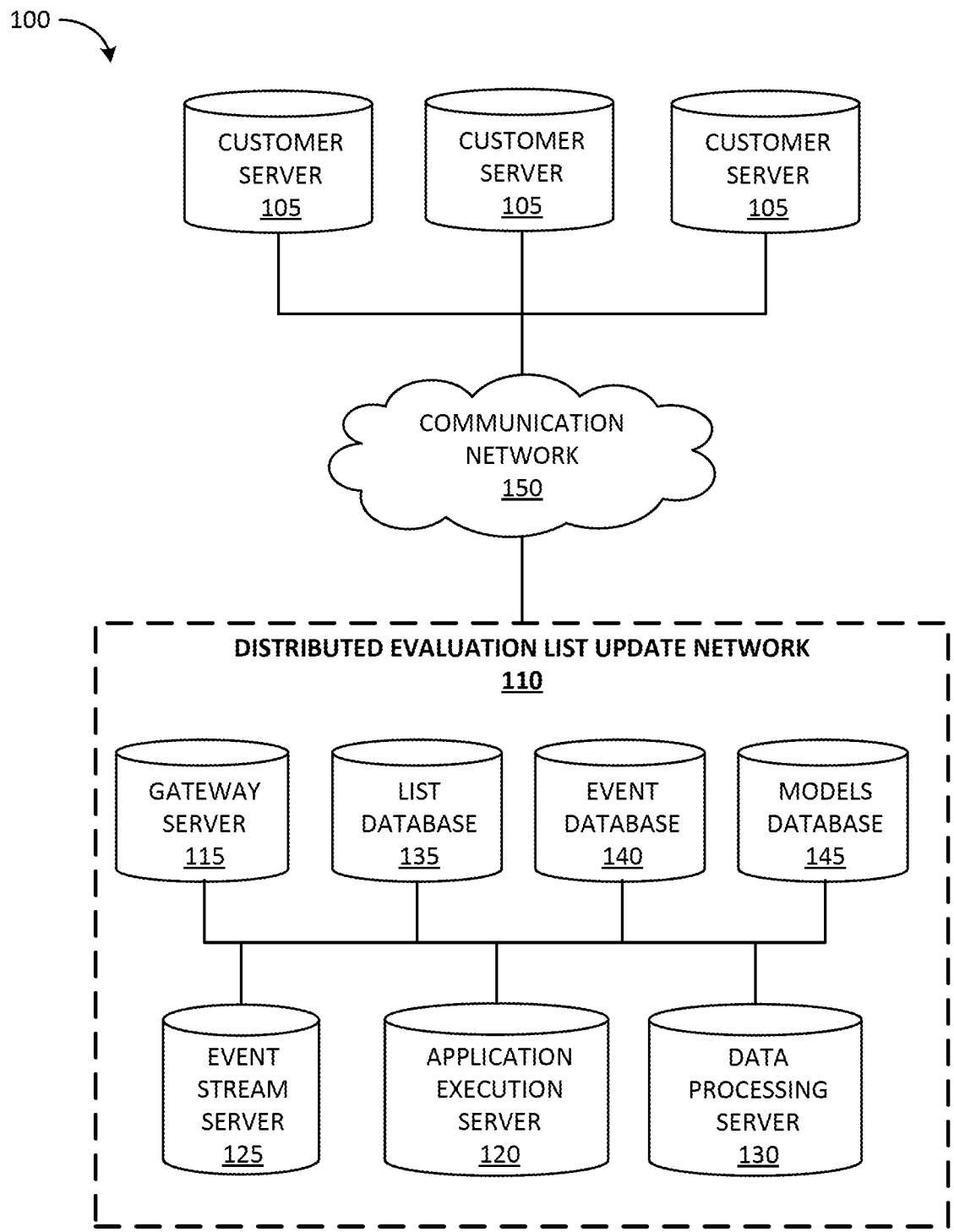
FIG. 1 is a block diagram of a distributed evaluation list update system according to some embodiments.

Other aspects of the embodiments described herein will become apparent by consideration of the detailed description.

DETAILED DESCRIPTION OF THE EMBODIMENTS

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware- and software-based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a block diagram of a distributed evaluation list update system 100 (referred to herein as "the system 100"). In the example shown, the system 100 includes a plurality of customer servers 105 (referred to herein collectively as "the customer servers 105" and individually as "the customer server 105") and a distributed evaluation list update network 110 (referred to herein as "the network 110"). In the illustrated example, the network 110 includes a gateway server 115, an application execution server 120, an event stream server 125, a data processing server 130, a list database 135, an event database 140, and a models database 145 (referred to herein collectively as "the one or more components of the network 110"). In some embodiments, the system 100 includes fewer, additional, or different components than illustrated in FIG. 1. For example, the system 100 may include a different number of customer servers and the three customer servers 105 included in FIG. 1 are purely for illustrative purposes.

The customer servers 105 and the network 110 (including the one or more components of the network 110) are communicatively coupled via a communication network 150. The communication network 150 is an electronic communications network including wireless and wired connections. Portions of the communication network 150 may be implemented using a wide area network, such as the Internet, a local area network, such as a Bluetooth™ network or Wi-Fi, and combinations or derivatives thereof. Alternatively or in addition, in some embodiments, components of the system 100 communicate directly with each other as compared to communicating through the communication network 150. For example, in some embodiments, the gateway server 115, the application execution server 120, the event stream server 125, the data processing server 130, the list database 135, the event database 140, and the models database 145 communicate directly with each other over one or more wired communication lines or buses, as illustrated in FIG. 1. Also, in some embodiments, the components of the system 100 communicate through one or more intermediary devices not illustrated in FIG. 1.

Figure 2:
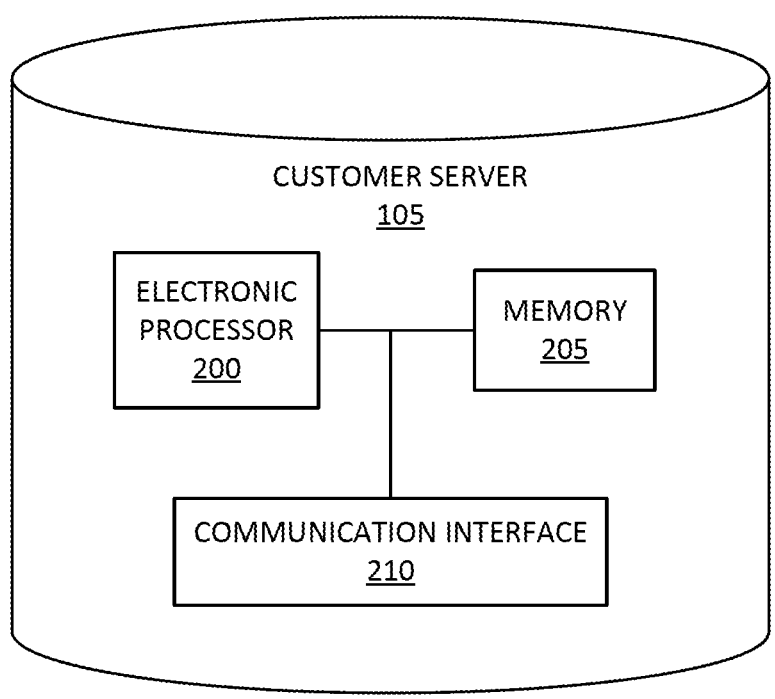
FIG. 2 is a block diagram of a customer server of the system of FIG. 1 according to some embodiments.

The customer server 105 may be a computing device and may include a desktop computer, a terminal, a workstation, a laptop computer, a tablet computer, a mobile device, or the like. As illustrated in FIG. 2, the customer server 105 includes an electronic processor 200 (for example, a microprocessor, an application-specific integrated circuit, or another suitable electronic device for processing data), a memory 205 (for example, a non-transitory computer-readable medium or another suitable memory device), and a communication interface 210. The electronic processor 200, the memory 205, and the communication interface 210 communicate wirelessly, over one or more communication lines or buses, or a combination thereof. The customer server 105 may include additional, fewer, or different components than those illustrated in FIG. 2 in various configurations. For example, although not illustrated, the customer server 105 may include a human-machine interface including one or more input devices, one or more output devices (for example, a display device), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

The communication interface 210 allows the customer server 105 to communicate with devices external to the customer server 105. For example, as illustrated in FIG. 1, the customer server 105 may communicate with the network 110 through the communication interface 210. In particular, the communication interface 210 may include a port for receiving a wired connection to an external device (for example, a universal serial bus ("USB") cable and the like), a transceiver for establishing a wireless connection to an external device (for example, over one or more communication networks 150, such as the Internet, local area network ("LAN"), a wide area network ("WAN"), and the like), or a combination thereof.

The customer server 105 may provide an application (or service) to a user (for example, an end user, a group of users, an organization, another user entity, and the like). The user may interact with the customer server 105 either directly or indirectly via one or more intermediary devices (not shown). In some embodiments, the customer server 105 is part of a computing network, such as a distributed computing network, a cloud computing service, or the like. In such embodiments, the customer server 105 may communicate with the network 110 as part of providing a cloud-based service to a user using a user device (not shown). Alternatively or in addition, the customer server 105 may be a user device used directly by a user to interact with the network 110. The customer server 105 may interact with the network 110 (via, for example, the communication network 150) to leverage or access application functionality supported or provided by the network 110. In some embodiments, the network 110 supports a web application, such as a financial services application, that provides financial services such that a user may access a corresponding user account to interact with and manage financial transactions, services, data, and the like. Alternatively or in addition, in some embodiments, the network 110 supports a web application providing supplemental functionality for a different application, such as supplemental security functions or mechanisms for a financial services application. For example, the network 110 may support request validation functionality, fraud detection and monitoring functionality, and the like for a financial services application supported by one or more of the customer servers 105.

As noted above and illustrated in FIG. 1, the network 110 includes the gateway server 115, the application execution server 120, the event stream server 125, the data processing server 130, the list database 135, the event database 140, and the models database 145. However, in some embodiments, the network 110 includes additional, fewer, or different components than illustrated in FIG. 1 in various configurations.

Alternatively or in addition, in some embodiments, the functionality (or a portion thereof) described as being provided by the network 110, one or more components of the network 110, or a combination thereof may be distributed among multiple networks, devices, servers, and the like. Alternatively or in addition, in some embodiments, the functionality (or a portion thereof) described as being provided by the network 110, one or more components of the network 110, or a combination thereof may be combined into a single device or server. For example, in some embodiments, the network 110 may include a single device or server (for example, a network server or a web server) configured to provide the functionality described herein as being provided by the one or more components of the network 110.

Although not illustrated, the gateway server 115, the application execution server 120, the event stream server 125, the data processing server 130, the list database 135, the event database 140, and the models database 145 may include similar components as the customer server 105 (an electronic processor, a memory, and a communication interface). However, in some embodiments, the gateway server 115, the application execution server 120, the event stream server 125, the data processing server 130, the list database 135, the event database 140, the models database 145, or a combination thereof includes additional, fewer, or different components.

Figure 3:
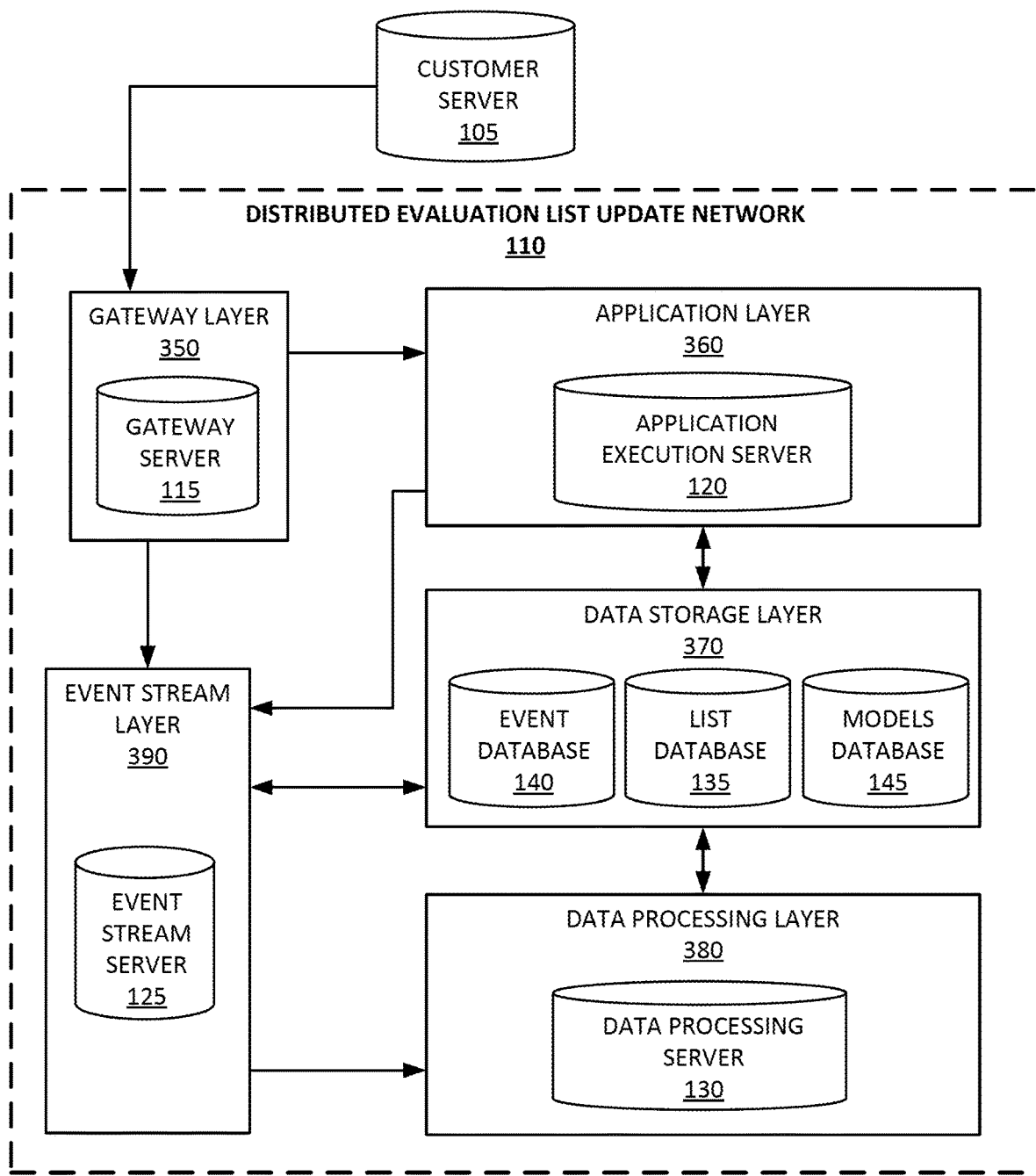
FIG. 3 is a block diagram illustrating a tiered application pattern provided by the system of FIG. 1 according to some embodiments.

In some embodiments, the network 110 has a multitier application architecture (or a multilayer application pattern). For example, as illustrated in FIG. 3, the network 110 may include a gateway layer 350, an application layer 360, a data storage layer 370, a data processing layer 380, and an event stream layer 390. In some embodiments, the network 110 may include additional, different, or fewer layers than illustrated in FIG. 3 in various configurations. Additionally, each layer may include additional, different, or fewer components than illustrated in FIG. 3 in various configurations.

As seen in FIG. 3, the gateway layer 350 may include the gateway server 115. The functionality described herein as being performed by the gateway layer 350 may be performed by the gateway server 115 (via an electronic processor executing instructions). The gateway layer 350 functions as an entry point to the network 110. In some embodiments, the gateway layer 350 serves as the only publicly accessible entry point to the network 110. As such, the gateway layer 350 is configured to receive one or more requests from the customer server 105 and process the received requests, and, ultimately, trigger application functionality (via the other layers of the tiered application pattern). Accordingly, in some embodiments, the gateway layer 350 contains or functions as an application programmable interface ("API") gateway. In some embodiments, the gateway layer 350 includes multiple technology components (not shown) incorporated into a single layer that serves a functional purpose. For example, the gateway layer 350 may include technology components that implement edge security technology, enforce encryption protocols, and the like. Accordingly, the gateway server 115 may validate request structure, enforce one or more security rules, and the like.

The application layer 360 may include the application execution server 120. The functionality described herein as being performed by the application layer 360 may be performed by the application execution server 120 (via an electronic processor executing instructions). The application execution server 120 executes (or performs) application or product functionality that supports an underlying application of the network 110. The functionality may include, for example, the business logic for handling and responding to incoming requests from the gateway server 115. As seen in FIG. 3, in some embodiments, the application execution server 120 may interact with the data storage layer 370 as part of performing the functionality. For example, the application execution server 120 may perform request validation for requests against one or more evaluation lists (or versions thereof). An evaluation list may be used by an application during application event processing to help provide business value. For example, evaluation list primitives may be used to support innovation and rich application functionality. Additionally, use of the evaluation list may enable an application to query an appropriate data storage system for a data set with support configured live evaluation list versions (for example, an evaluation list version actively accessible by the application). Alternatively or in addition, in some embodiments, the application execution server 120 interacts with the event stream layer 390. For example, the application execution server 120 may write one or more request events to the event stream layer 390 for further processing by the data processing layer 380.

The event stream layer 390 may include the event stream server 125. The functionality described herein as being performed by the event stream layer 390 may be performed by the event stream server 125 (via an electronic processor executing instructions). The event stream server 125 provides event stream processing. Request events are streamed into the event stream layer 390 (for example, from the application execution server 120, the gateway server 115, or a combination thereof). A request event streamed into the event stream layer 390 may be stored in the event database 140 for further processing with the data processing layer 380 (via the data processing server 130). The event stream layer 390 (the event stream server 125) may include an event aggregation component (not shown) that aggregates events for bulk or batch processing by, for example, the data processing server 130. In some embodiments, the event stream server 125 triggers the data processing server 130 (for example, with an event notification) to, for example, access and process one or more events stored in the event database 140.

The data processing layer 380 may include the data processing server 130. The functionality described herein as being performed by the data processing layer 380 may be performed by the data processing server 130 (via an electronic processor executing instructions). The data processing server 130 is configured to access and process one or more request events from the event database 140. In some embodiments, the data processing server 130 is configured to process a request event by generating and transmitting an updated version of an evaluation list, creating a new evaluation list, or a combination thereof.

An evaluation list is generally used to modify application behavior based on a content of the evaluation list (for example, a listing of data attributes) and an application's understanding of the evaluation list. An evaluation list may be constructed from processed data attributes of requests. Alternatively or in addition, an evaluation list may be constructed from data sets created from machine learning analysis. An evaluation list may be, for example, an allow list, a block list, a reputation list, or the like. An allow list includes a listing of data attributes that, when associated with a request, application behavior relating to the request is allowed. For example, an allow list may include a listing of Internet Protocol (IP) addresses. When a request associated with an IP address included in the allow list is received, the request may be validated or allowed. A block list includes a listing of data attributes that, when associated with a request, application behavior relating to the request is not allowed. For example, a block list may include a listing of Internet Protocol (IP) addresses. When a request associated with an IP address included in the block list is received, the request may be invalidated or not allowed. A reputation list includes a listing of identifiers, such as IP addresses. Each identifier included in the reputation list is associated with a reputation metric. A reputation metric indicates a reputation of the corresponding identifier. For example, a reputation metric may provide an indication of how suspicious previous activity associated with an identifier has been. For example, the reputation list may include an IP address (an identifier) that is associated with a negative reputation metric because suspicious activity is associated with that IP address.

The data processing server 130 may transmit list information (for example, the updated evaluation list, an updated version of the evaluation list, the new evaluation list, or a combination thereof) to the list database 135 for storage. As noted above, in some embodiments, the data processing server 130 accesses multiple request events for bulk or batch processing. Accordingly, the data processing layer 380 may utilize the notion of notifications and queues to create fan out capabilities. Accordingly, the data processing layer 380 may include a notification component (not shown) and a queue component (not shown). For example, when request events are fanned out, the request events may be processed multiple times by different compute functions.

The data storage layer 370 may include the list database 135, the event database 140, and the models database 145. In some embodiments, the data storage layer 370 may include additional, fewer, or different components or databases than those illustrated in FIG. 3 in various configurations. For example, in some embodiments, the list database 135, the event database 140, the models database 145, or a combination thereof may be combined within a single database or distributed among multiple databases. As noted above, the event database 140 stores request events associated with the requests received at the gateway server 115. The list database 135 receives the updated version of an evaluation list, the new evaluation list, or a combination thereof (as list information) and stores the list information. The list database 135 enables the application execution server 120 to access the list information for performing application functionality, such as request validation functionality. The models database 145 stores one or more machine learning models used for performing machine learning functions. The models database 145 enables the application execution server 120 to access the machine learning models for performing application functionality, such as request validation functionality.

Figure 4:
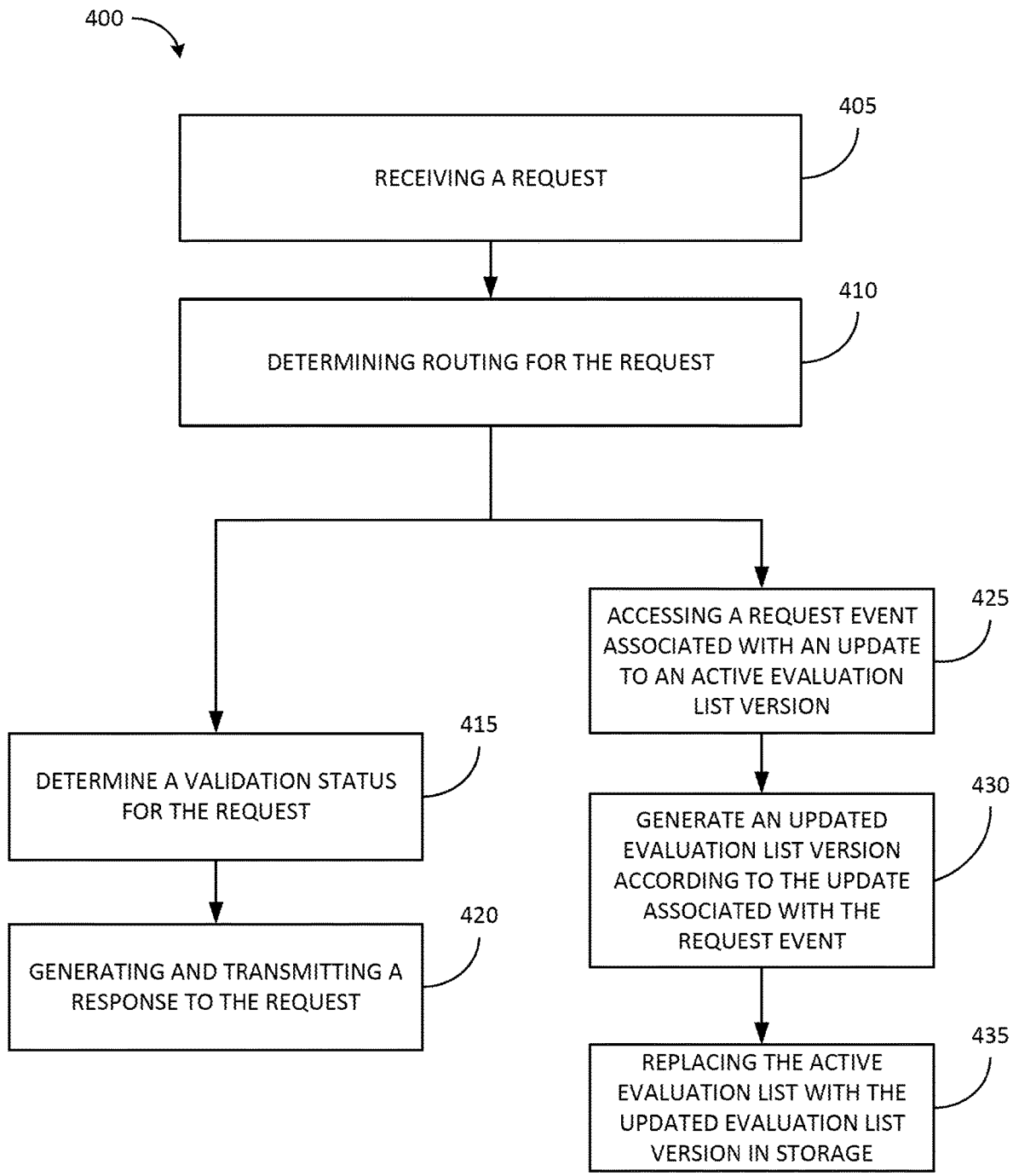
FIG. 4 is a flow chart of a method of providing distributed evaluation list updating using the system of FIG. 1 according to some embodiments.

FIG. 4 is a flowchart illustrating a method 400 for providing distributed evaluation list updating according to some embodiments. The method 400 will be described with reference to FIG. 3, which illustrates the decoupled design and distributed notification architecture of the system 100. As seen in FIG. 4, the method 400 includes receiving a request (at block 405). As noted above and illustrated in FIG. 3, the gateway server 115 may receive the request from a customer server 105. In some embodiments, the gateway server 115 receives the request from the customer server 105 through the communication network 150. For example, the gateway server 115 may receive the request from the customer server 105 through a virtual private network ("VPN"), a public connection (for example, public internet), and the like.

After receiving the request from the customer server 105, the gateway server 115 processes the request to determine routing for the request (at block 410). For example, as seen in FIG. 3, the gateway server 115 may transmit the request to the event stream server 125, the application execution server 120, or a combination thereof. The gateway server 115 may determine routing for a request based on a characteristic of the request, such as a request type, request metadata, and the like. In some embodiments, the gateway server 115 determines whether the request is related to request validation. When the gateway server 115 determines that the request is related to request validation, the gateway server 115 may transmit the request to the application execution server 120 for validation. Alternatively or in addition, the gateway server 115 determines whether the request is associated with an update to an evaluation list. When the gateway server 115 determines that the request is associated with an update to an evaluation list, the gateway server 115 may transmit the request to the event stream server 125 for further processing by the data processing server 130.

In response to receiving the request (for example, a validation request) from the gateway server 115, the application execution server 120 performs application functionality to validate the request. The application execution server 120 may validate a request by determining a validation status for the request (at block 415). A validation status indicates whether a corresponding request is valid or invalid (for example, a fraudulent request), and, ultimately whether the underlying application behavior associated with the request should be allowed, blocked, or the like.

In some embodiments, the application execution server 120 determines the validation status by identifying a data attribute associated with the request (or request metadata) and accessing list information from the list database 135. The application execution server 120 then determines the validation status for the request based on the data attribute associated with the request (or request metadata) and the list information accessed from the list database 135.

In some embodiments, the application execution server 120 determines a validation status for the request based on whether an identified data attribute is present or exists within an evaluation list (the list information). For example, when the evaluation list is an allow list, the application execution server 120 may determine the validation status for the request to be "valid" when a data attribute associated with the request is included in the evaluation list. However, when the data attribute associated with the request is not included in the evaluation list, then the application execution server 120 may determine the validation status for the request to be "not valid." As another example, when the evaluation list is a block list, the application execution server 120 may determine the validation status for the request to be "valid" when a data attribute associated with the request is not included on the list. However, when the data attribute associated with the request is not included in the evaluation list, then the application execution server 120 may determine the validation status for the request to be "not valid."

Alternatively or in addition, the application execution server 120 determines a validation status for the request based on additional data attributes included in an evaluation list. For example, when the evaluation list is a reputation list, the application execution server 120 may determine the validation status for the request based on a reputation metric associated with a data attribute of the request. The application execution server 120 may determine the validation status to be "valid" when a data attribute of the request is associated with a positive or good reputation metric. However, the application execution server 120 may determine the validation status to be "not valid" when a data attribute of the request is associated with a negative or bad reputation metric.

In some embodiments, the application execution server 120 determines the validation status for the request using a machine learning model stored in the models database 145. Accordingly, in such embodiments, the application execution server 120 accesses a machine learning model from the models database 145 and applies the machine learning model to one or more data attributes associated with the request (or request metadata), the list information, or a combination thereof.

After validating the request (for example, as either valid or not valid), the application execution server 120 generates and transmits a response to the request (at block 420). The response includes the validation status associated with the request. In other words, the response may indicate whether the request was validated or not validated. In some embodiments, the response includes additional information. For example, the response may include a listing of data attributes used to determine the validation status, an identifier of the evaluation list used to determine the validation status, an identifier of the version of evaluation list used to determine the validation status, and the like. In some embodiments, the response is transmitted to the customer server 105 that the request originated from.

Alternatively or in addition, in some embodiments, the application execution server 120 performs the underlying application functionality associated with the request in response to determining the validation status. For example, when the application execution server 120 determines that a request is valid, the application execution server 120 may further perform application functionality related to the valid request, such as, for example, enabling a user to interact with financial data or perform a financial transaction. In such embodiments, the response includes a result to the application execution server 120 performing the underlying application functionality associated with the validated response.

As noted above, in some embodiments, the request received at the gateway layer 350 is associated with an update to an evaluation list. When the request is associated with an update to an evaluation list, the gateway server 115 may route the request (as an update request or request event) to the event stream layer 390 for further processing by the data processing server 130. Accordingly, in some embodiments, evaluation list updates (including creation of a new evaluation list) are performed out-of-band from, for example, the application layer 360.

In response to receiving the request event, the event stream server 125 processes the request event. In some embodiments, the event stream server 125 processes the request event by performing event aggregation with one or more request events, as noted above. The event stream server 125 forwards the request event to the event database 140 for storage. In some embodiments, the event stream server 125 also generates and transmits an event notification to the data processing server 130.

In response to receiving the event notification, the data processing server 130 may be triggered to access the request event. Accordingly, as seen in FIG. 4, the data processing server 130 receives the request event (at block 425). The request event may be associated with an update to an active evaluation list version. The data processing server 130 may access the request event from the event database 140. As noted above, in some embodiments, the data processing server 130 may perform bulk or batch processing. Accordingly, in such embodiments, the data processing server 130 may access more than one request (aggregated requests) from the event database 140 and performs an update associated with the accessed requests.

After accessing the request event, the data processing server 130 may perform an update associated with the request event. For example, as seen in FIG. 4, the data processing server 130 may generate an updated evaluation list version according to the update associated with the request event (at block 430).

An update may include a partial or full update (or replacement) of entries included in an evaluation list. For example, the data processing server 130 may update a subset of the entries included in an evaluation list (as a partial update). Alternatively or in addition, the data processing server 130 may update all entries included in an evaluation list (as a full update). The data processing server 130 may perform updates to evaluation lists in an incremental manner such that each update request triggers the generation of a new, subsequent version of an evaluation list (as an updated evaluation list version to an active evaluation list version). In some embodiments, an update associated with an evaluation list includes the creation or generation of a new evaluation list. Accordingly, in some embodiments, the data processing server 130, performs an update by generating an updated evaluation list version according to the update associated with the request event. Alternatively or in addition, in some embodiments, the data processing server 130 performs an update by generated a new evaluation list.

After performing the update, the data processing server 130 transmits a result of performing the update operation. The result of performing the update operation may include, for example, a new evaluation list, an updated evaluation list version, and the like. For example, as seen in FIG. 4, the data processing server 130 replaces the active evaluation list with the updated evaluation list version in storage (at block 435). As seen in FIG. 3, the data processing server 130 may transmit the result to the list database 135 for storage. The result may be stored in the list database 135 as list information. As noted above, the data processing server 130 may perform updates to an evaluation list in an incremental manner. Accordingly, in such embodiments, the list database 135 stores multiple versions of an evaluation list. For example, the list database 135 may store an active evaluation list version currently relied upon by the application execution server 120 for request validation and one or more previous evaluation list versions. In some embodiments, upon receipt of the updated evaluation list version at the list database 135, the updated evaluation list version becomes the active evaluation list version that the application execution server 120 relies on for request validation.

In some embodiments, application execution server 120 (for example, request application code) understands how the list database 135 exists and is able to automatically attempt to upgrade such that a latest or most updated evaluation list version is relied upon for request validation. However, when a latest or most updated evaluation list version is unavailable, the application execution server 120 may fall back on a previous evaluation list versions (when previous evaluation list versions are available).

Accordingly, in some embodiments, the event stream server 125 effectively issues an update (as a request event) or detects when a list has been modified through notifications to an update queue (for example, the event database 140). The queue may be used to replicate changes to multiple evaluation list instantiations dynamically. The queue is processed by a data processing application (for example, via the data processing server 130), which acts on the list update (for example, the request event) and modifies the active evaluation list version or creates a new evaluation list version. In other words, the embodiments described herein update data-driven lists using a distributed evaluation list update system having a decoupled design and a distributed notification architecture such that updates are handled out-of-band.

Thus, the embodiments described herein provide, among other things, methods and systems for distributed evaluation list updating. Various features and advantages of the invention are set forth in the following claims.

What is claimed is:

1. A distributed evaluation list update system, the system comprising:
    a data processing server, the data processing server configured to
        receive a request event associated with an update to an active evaluation list version, the active evaluation list version actively accessible for request validation, wherein the request event is a write on an event stream server that is related to the update, and wherein the event stream server stores the request event in storage, with the storage accessible by the data processing server for further processing of the request event,
        generate an updated evaluation list version according to the update associated with the request event, and
        replace the active evaluation list with the updated evaluation list version in the storage, wherein, in response to storing the updated evaluation list version, the updated evaluation list version is actively accessible for the request validation.

2. The system of claim 1, further comprising:
    an application execution server configured to
        receive a request,
        access at least the updated evaluation list version from the storage,
        determine a validation status for the request based on the updated evaluation list version, and
        generate and transmit a response to the request, the response including the validation status.

3. The system of claim 2, wherein the application execution server is configured to receive the request from a gateway server.

4. The system of claim 2, wherein the application execution server is configured to determine the validation status for the request based on whether a data attribute exists in the updated evaluation list version.

5. The system of claim 2, wherein the application execution server is configured to determine the validation status for the request based on an additional data attribute included in the updated evaluation list version.

6. The system of claim 2, wherein the application execution server is configured to determine the validation status for the request based on whether a data attribute exists in the updated evaluation list version and an additional data attribute included in the updated evaluation list version.

7. The system of claim 2, wherein the application execution server is further configured to, in response to the updated evaluation list version being unavailable, access a previously-active evaluation list version from the storage and determine the validation status for the request based on the previously-active evaluation list version.

8. The system of claim 1, further comprising:
a gateway server configured to
receive a request from a customer server,
determine routing for the request,
in response to determining that the request is related to request validation, route the request to an application server for request validation, and
in response to determining that the request is related to a list update, route the request to the event stream server for further processing by the data processing server.

9. The system of claim 1, wherein the active evaluation list version includes at least one selected from a group consisting of a block list version, an allow list version, and a reputation list version.

10. The system of claim 9, wherein the reputation list version includes a set of identifiers, wherein each identifier included in the set of identifiers is associated with a reputation metric.

11. The system of claim 1, wherein the data processing server is configured to generate the updated evaluation list version out-of-band from the request validation.

12. A method of providing distributed evaluation list updating, the method comprising:
receiving, with a data processing server, a request event associated with an update to an active evaluation list version, the active evaluation list version actively accessible by an application server for request validation, wherein the request event is a write on an event stream server that is related to the update, and wherein the event stream server stores the request event in storage, with the storage accessible by the data processing server for further processing of the request event;
generating, with the data processing server, an updated evaluation list version according to the update associated with the request event;
replacing, with the data processing server, the active evaluation list version with the updated evaluation list version in the storage; and
in response to receiving a request,
determining, with the application server, a validation status for the request using the updated evaluation list version, and
generating and transmitting, with the application server, a response to the request, the response including the validation status.

13. The method of claim 12, further comprising:
in response to the updated evaluation list version being unavailable, determining, with the application server, the validation status for the request using a previously-active evaluation list version.

14. The method of claim 12, wherein determining the validation status for the request includes accessing, with the application server, the updated evaluation list version from a list database.

15. The method of claim 12, wherein accessing the request event includes accessing the request event in the storage in response to receiving, at the data processing server, an event notification from an event stream server.

16. The method of claim 12, wherein determining validation status for the request includes determining the validation status based on at least one selected from the group consisting of whether a data attribute exists in the updated evaluation list version and an additional data attribute included in the updated evaluation list version.

17. The method of claim 12, wherein generating the updated evaluation list version according to the update associated with the request event includes at least one selected from a group consisting of adding a new list entry to the active evaluation list version, updating a subset of list entries of the active evaluation list version, and updating all list entries of the active evaluation list version.

18. A non-transitory, computer-readable medium storing instructions that, when executed by an electronic processor, perform a set of functions, the set of functions comprising:
in response to storing a request event in a data storage layer, receiving, with a data processing layer, the request event from the data storage layer, the request event associated with an update to an active evaluation list version actively accessible by an application layer for request validation, wherein the request event is a write on an event stream layer that is related to the update, and wherein the event stream layer stores the request event in the data storage layer, with the data storage layer accessible by the data processing layer for further processing of the request event;
generating, with the data processing layer, an updated evaluation list version according to the update; and
enabling, with the data processing layer, access to the updated evaluation list version by an application layer for the request validation.

19. The computer-readable medium of claim 18, wherein enabling access to the updated evaluation list version includes replacing the active evaluation list with the updated evaluation list version in a list database accessible by the application layer.

20. The computer-readable medium of claim 18, wherein generating the updated evaluation list version includes generating the updated evaluation list version out-of-band from the request validation.

* * * * *